Nov. 2, 1943.  W. C. MILES  2,333,484
FISH LURE
Filed May 29, 1941
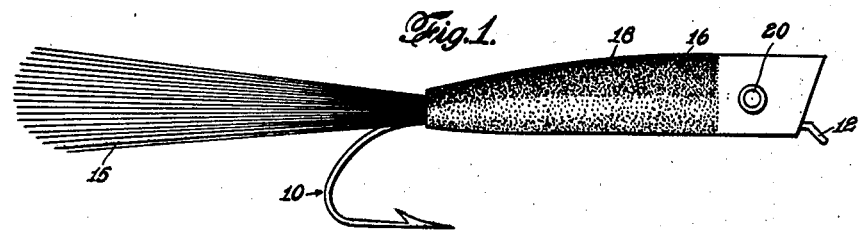
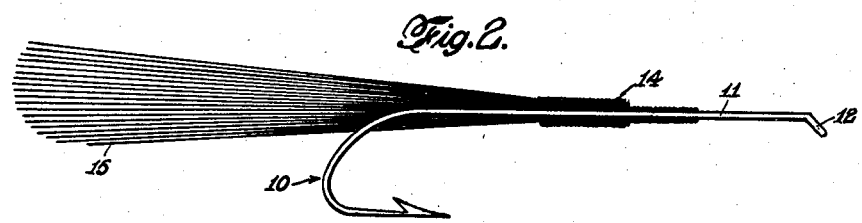
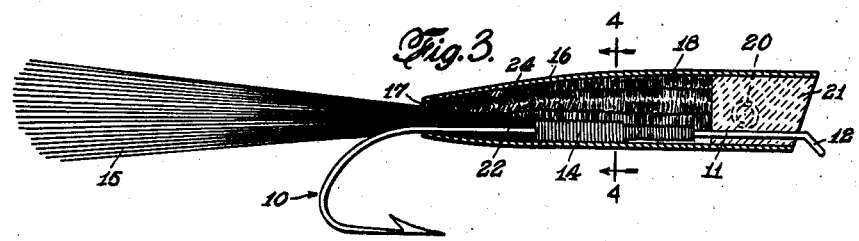
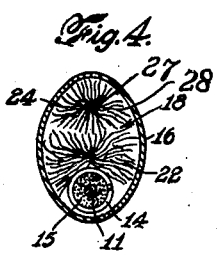 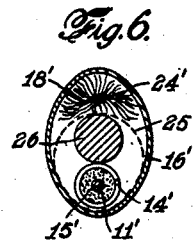
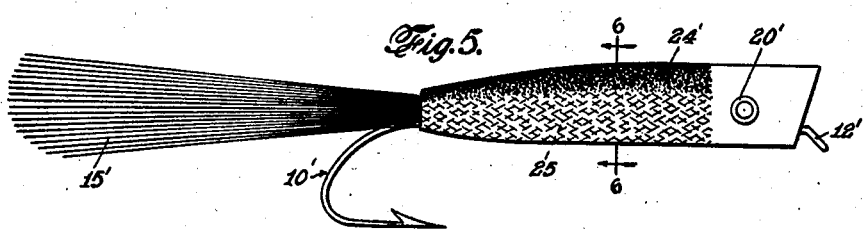
INVENTOR.
William C. Miles Patented Nov. 2, 1943

2,333,484

UNITED STATES PATENT OFFICE 2,333,484

FISH LURE

William C. Miles, White Plains, N. Y.

Application May 29, 1941, Serial No. 395,753

20 Claims. (Cl. 43—48)

This invention relates to fish lures, and has particular reference to that class of lures which includes imitations of many forms of animal life that are peculiar to the food supply of various species of game fish.

Generally speaking, any lure falling within the above-mentioned class is provided with a body corresponding to the body of one or another of said forms of animal life. Usually the lure bodies are colored, and in many instances it is desirable that the body coloration be such as to lend the same color effect and the same fleshy appearance to the lure that is presented by the particular living thing that such lure is intended to simulate—as for example a minnow, the color-appearance of which is difficult to attain and the fleshy-appearance of which is notably difficult, if not impossible, to attain with any pronounced degree of fidelity in an artificial lure.

Important objects of the present invention are (1) to facilitate the obtaining of fish-lure-body-colorations in general, (2) obviate the many difficulties ordinarily encountered in obtaining fish-lure-body-colorations which pronouncedly correspond to the body-colorations that are to be observed in many forms of animal life on which various species of game fish feed—for example the coloration peculiar to the body of a minnow, and (3) provide for faithful reproduction, in a fish lure body, of the fleshy appearance peculiar to the body of any one of several forms of animal life which are included in the food supply of certain species of game fish and among which a minnow may be mentioned as offering a striking example of body fleshiness that is generally regarded as difficult, if not impossible, to reproduce with any appreciable degree of fidelity in an artificial lure.

Other objects and advantages of the present invention will become apparent from the following description when taken in connection with the accompanying drawing, in which—

Fig. 1 is a side elevation of a fish lure simulating a minnow and constructed in accordance with one form of the present invention, Fig. 2 is a view illustrating in section and in elevation the hook assembly employed in the lure of Fig. 1, Fig. 3 is a vertical longitudinal sectional view of the lure appearing in Fig. 1, Fig. 4 is a transverse sectional view taken on line 4—4 of Fig. 3, Fig. 5 is a side view of a fish lure simulating a minnow and constructed in accordance with a modified form of the present invention, Fig. 6 is a transverse sectional view taken on line 6—6 of Fig. 5, and Fig. 7 is a view in elevation of a tubular braided element adapted for use in connection with the form of invention illustrated in Figs. 5 and 6.

Referring to Figs. 1 to 4 of the drawing, wherein is illustrated on a scale of 2 to 1 a bass lure constructed in accordance with one form of the present invention, the numeral 10 indicates a fish hook, the shank portion 11 of which is formed at its front end with a turned down eye 12 by which the lure may be attached in conventional manner to a fishing line. In actual practice, I have employed to advantage, in lures constructed in accordance with the present invention, the so-called Limerick hook manufactured by S. Allcock & Co., Ltd. and identified in the trade under stock No. 2811.

To the shank portion 11 of the hook there are suitably connected, as by a binding 14 of silk thread, a plurality of tail-forming elements 15, herein illustrated as hairs—although feathers as well as other suitable tail-forming elements or materials may be employed.

After attaching the tail-forming elements 15 to the hook 10, the shank 11 of the hook is introduced into a transparent, or substantially transparent, body shell 16 through the rear opening 17 thereof and is moved forwardly, with reference to the shell, a sufficient distance to allow the eye 12 of the hook to assume the position in which it appears in Figs. 1 and 3.

The body shell 16 may be molded from a suitable plastic, such as Tenite, Lucite and other generally similar materials, although I commercially use quills of turkey wing feathers in fabricating highly satisfactory body shells, an ample degree of transparency in the shells being attained by coating them inside and outside with a clear water proof lacquer which also serves to render them impervious to moisture which might otherwise be undesirably absorbed by the shell structure per se. Following the step of positioning the hook 10 so that its shank 11 lies in a close and contiguous relation to the lower inner wall surface of the shell 16, as shown in Fig. 3, a decorative filler 18 is inserted in the shell by way of the open front end thereof, the filler, as shown in Fig. 3, being disposed in a contiguous relation to the hook shank and having its front end located at a point somewhat at the rear of a transverse plane passing through a pair of eye-simulating devices 20, such as rivets, with which the front or head portion of the lure is provided.

In order that the hook shank 11, the filler 18 and the shell 16 may be effectively united to prevent relative displacement, a suitable clear water proof cement is injected into the cavity of the shell where it, upon hardening, not only permanently unites the shank, filler and shell into a rigid unitary structure but also effectively seals the rear end of the shell so as to prevent the entrance of water by way of the opening 17.

As a final step in the fabrication of the lure shown in Figs. 1 to 4, a quantity of suitable water proof cement is injected into the front or head end of the shell 16 in such quantity as will fill the entire shell cavity at the front of the filler 18 and there form a plug-like closure 21, which seals the lure at its head end against the entrance of water and at the same time further anchors the hook 10 and shell 16 to each other. The cement entering into the formation of the plug-like closure 21 may be appropriately colored to attain a desired coloration of the head end of the lure inasmuch as the closure, and hence its color, is readily discernible through the wall of the shell 16.

In order that the far reaching possibilities of the present invention may become apparent to those skilled in the art, I will now particularly describe how it may be employed to obtain, in a fish lure of the artificial minnow type, not only the body coloration but also the fleshy appearance of a live minnow, which is characterized, as are minnows in general, by the fact that its back is dark whereas its sides and remaining body portions are light. To obtain in an artificial lure of the minnow type a dark back in contrast to the lighter body portions, the dark and light portions, being, accordingly, stippled in Fig. 1, I resort to use, in the decorative filler 18, of a pair of color-lending elements 22 and 24, the former or lowermost of which is white and the latter or uppermost of which is of a contrasting color— the term "white" (also the term "black"), wherever employed herein, being used broadly as indicative of color.

It may be well to amplify the foregoing by pointing out that if it is desired, for example, to simulate, according to the present invention, a widely found species of minnow which is characterized by the fact that its back is brown whereas its remaining body portions are white, the desired coloration may be attained by so selecting the color-lending elements 22 and 24, with reference to color, that they, when viewed through the transparent or substantially transparent shell 16, will offer the desired color combination—namely, brown and white, the brown color-lending element 24 being superimposed on the white color-lending element 22 in a contiguous relation thereto and each of such elements being of a length corresponding to the body length of the lure.

As to the color lending elements 22 and 24, have discovered that an ordinary commercial mat material of pile character, namely, chenille, having a wire core 27 and a pile 28, may be used to a pronounced advantage—first, because it may be easily inserted into the body 18 to obtain a desired body coloration, and, second, because it has the property of lending to the lure body a distinct fleshy appearance remarkably similar to that of the fleshy and partially transparent body portions of various forms of animal life, among which may be notably mentioned a minnow, which constitute a large part of the food supply of many species of game fish. The fleshy appearance of an artificial lure, constructed in accordance with the present invention, may possibly be due to a combination of optical factors but can, I believe, be accounted for, at least in part, by the presence of the chenille pile, the fineness of which seemingly determines the apparent texture of the fleshy appearance of the body of the lure and the extent to which the pile fibres are displaced from their normal radial positions as the chenille is introduced into the body seemingly having some bearing on the degree of transparency that is attained in the lure body. Thus, it will be understood that—(1) the coarser the pile fibres the coarser will be the apparent texture of the fleshy appearance of the lure body, (2) the greater the diameter of the chenille for a given size body shell the greater will be the displacement of the pile fibres from their normal radial positions and hence the less transparent will be the lure body. Since variations in the fineness of the chenille pile and/or in the diameter of the chenille alter, in degree, the general appearance of the lure body, it becomes apparent that such variations afford a simple measure by which changes, over a relative wide range, in the appearance of the lure may be attained in the interest of fidelity with respect to that which is to be represented by it at the time of its fabrication.

Although the invention is above particularly described in connection with the production of a multi-color body effect, one will readily understand that it may be employed to advantage in cases where a single or solid body color is desired. In this connection it may be well to mention that in fabricating lures according to the present invention, I have in each of certain instances employed to advantage a single length of chenille of appropriate color to effect such individual arbitrary body colors as white, yellow, etc., and in each of other instances, I have used to equal advantage a single length of appropriately colored chenille to obtain a definite body coloration comparable to that of a selected form of animal life to be simulated—for example, a soft-shell crawfish having a body solidly-colored to present a yellowish orange hue.

In Figs. 5 to 7, I have illustrated, on a scale of 2 to 1, a modified form of bass lure embodying the present invention, primed reference characters being employed to indicate such elements in the modified form of lure as are identical with those which are respectively indicated by corresponding unprimed reference characters in Figs. 1 to 4.

A structural distinction between the form of lure shown in Figs. 1 to 4 and that of Figs. 5 to 7 resides in the difference between their respective decorative fillers 18 and 19′, the latter including a color lending element 25 which is of a length corresponding to the body length of the lure and on which is superimposed a color lending element 24′ of chenille as and for the purpose described in connection with the chenille element 24.

As to the color lending element 25, I have discovered that commercial braided tubing of various materials, such as "Cellophane," silk and even metal, may be used to advantage inasmuch as the meshing material pronouncedly simulates a scale surface such as is to be observed on the body of many species of minnows. Of the tube-forming materials just mentioned, I prefer "Cellophane," which, in tube form, I have used in various colors—notably, white, silver and gold— sometimes in the absence of the filler element 24′ and sometimes in the presence of that element colored, as desired, in accordance with or in contrast to the color of the braided tubing 25.

It is to be noted that braided tubing such as I have employed, even though normally self sustaining, is such that it may be readily distorted i. e. expanded, contracted and collapsed. The susceptability of the tubing 25 to expansion and contraction enables it to assume a shape corresponding to the inner contour of the body shell 16' so that it, while being cemented in place, will lie close to the inner wall of the shell throughout the body length of the lure. The collapsibility of the tubing 25, before being cemented in place, enables it, while in the body shell 16', to be so flattened as to provide for easy insertion of the color lending element 24'.

In casting according to some methods, among which may be mentioned that which is known as "spinning," it is necessary to resort to the use of lures which are substantially heavier than are those employed when casting in accordance with the conventional fly rod methods. In order to meet such weight-requirement, a weight-lending element 26, such as a lead wire of appropriate length, is inserted into the tubing 25 after the hook shank 11' is introduced into that tubing by way of the opening 17' at the rear end of the lure. Inasmuch as the lead wire is confined with the tubing 25, where it and the hook shank 11' are cemented in place after the tubing has been likewise anchored, it follows that the tubing permits the use of the wire without its being observed in the finished lure, thus obviating any possibility of its detracting from the nicety of appearance which the finished lure presents.

The various elements herein set forth as illustrative of color-lending elements appropriate for use in decorative fillers according to the present invention are to be regarded as of textile character inasmuch as the materials which enter into these elements—namely, chenille, "Cellophane" in braided tubular form as well as silk and metal in braided tubular form—are operated on according to processes well known in the textile industry to produce these elements, of which their equivalents may be employed without departing from the spirit of the invention.

Having so described certain embodiments of the invention and having propounded such teaching of the invention in general as will readily enable those skilled in the art to not only reproduce said embodiments but also resort, in practicing the invention, to the use of various elements and materials constituting equivalents of those herein exemplified as characterizing the invention, I claim:

1. An artificial fish lure comprising a shell of transparent nature, a filler including a length of color-lending material of pile character carried within and visible through said shell.

2. An artificial fish lure comprising a shell of transparent nature, a filler including a plurality of lengths of color-lending material disposed side by side within and visible through said shell, the material peculiar to at least one of said lengths being of pile character.

3. An artificial fish lure comprising a shell of transparent nature, a filler including a plurality of lengths of color-lending material disposed in a contiguous relation to each other within said shell and there presenting contrasting colors visible through said shell.

4. An artificial fish lure comprising a shell of transparent nature, a filler including a pair of color-lending elements, one a core-pile structure and the other a braided structure, disposed in a contiguous relation to each other within said shell and there visible through said shell.

5. An artificial fish lure comprising a shell of transparent nature, a filler including a pair of lengths of color-lending material of textile character, one length being of core-pile construction and the other of braided construction, disposed in a contiguous relation to each other within said shell and there visible through said shell.

6. An artificial fish lure comprising a shell of transparent nature, a filler including a color-lending element, namely, a length of chenille, carried within and visible through said shell.

7. An artificial fish lure comprising a shell of transparent nature, a filler including a color-lending element in the form of a length of braided material carried within and visible through said shell.

8. An artificial fish lure comprising a shell of transparent nature, a filler including a color-lending element disposed within and visible through said shell, said element having a core with which are associated pile-like members extending generally radially therefrom.

9. An artificial fish lure comprising a shell of transparent nature, a filler including a pair of color-lending elements disposed in a contiguous relation to each other within and visible through said shell, at least one of said elements having a core with which are associated pile-like members extending generally radially therefrom.

10. An artificial fish lure comprising a shell of transparent nature, a filler including a pair of color-lending elements disposed in a contiguous relation to each other within and visible through said shell, one of said elements having a core with which are associated pile-like members extending generally radially therefrom and the other of said elements being of braided construction.

11. An artificial fish lure comprising a shell of transparent nature, a filler including a color-lending element in the form of a tube of braided material carried within and visible through said shell.

12. An artificial fish lure comprising a shell of transparent nature, a filler including a color-lending element in the form of a tube of braided material carried within and visible through said shell, and a weight-lending element carried within and concealed by said tube.

13. An artificial fish lure comprising a shell of transparent nature, a filler including a length of color-lending material of textile character carried within and visible through said shell, and cementitious material anchoring said filler in fixed position within said shell.

14. An artificial fish lure comprising a shell of transparent nature, a filler including a pair of color-lending elements, one a core-pile structure and the other a braided structure, disposed in a contiguous relation to each other within said shell and there visible through said shell, and cementitious material anchoring said color-lending elements to each other and to the inner surface of said shell.

15. An artificial lure comprising a shell of transparent nature, a filler including a color-lending element in the form of a tube of braided material carried within and visible through said shell, and a weight-lending element carried within and concealed by said tube, and cementitious material anchoring said tube to the inner wall of said shell and anchoring said weight-lending element to the inner wall of said tube.

16. That method of effecting coloration of a fish lure body which resides in introducing into a preformed body-forming shell of transparent nature a predetermined length of chenille characterized as to color in accordance with a desired body coloration.

17. That method of effecting a definite body appearance in a fish lure designed to simulate a given form of animal life which resides in introducing into a body-forming shell of transparent character a color-bearing element so characterized as to color and texture as to present in the lure a body color like and a body texture apparently like that of the body of said given form of animal life.

18. That method of effecting a definite body appearance in a fish lure designed to simulate a minnow of given species having a back contrasting in color to its remaining body portions which resides in introducing into a body forming shell of transparent nature a pair of color-lending elements so characterized as to color and texture as to present in the lure a body-color-pattern like and a body texture apparently like that of the body of said minnow.

19. That method of effecting coloration of a fish lure body which resides in introducing into a preformed body-forming shell of transparent nature a predetermined length of color-bearing material in the form of a unitary structure characterized as to color in accordance with a desired body coloration.

20. An artificial lure comprising a shell of transparent material, a filler including a length of color-lending material of pile character carried within and visible through said shell, said length of color-lending material being disposed in impinging engagement with and conforming to the inner wall surface of said shell.

WILLIAM C. MILES.